United States Patent [19]
Glass et al.

[11] Patent Number: 5,667,708
[45] Date of Patent: Sep. 16, 1997

[54] LASER BEAM DEFLECTOR FOR PROTECTION OF UNDERLYING PORTIONS OF AN ITEM DURING LASER CUTTING OF OVERLAYING STOCK

[75] Inventors: Robert H. Glass, Peoria; Gordon W. Kelly, Delavan, both of Ill.

[73] Assignee: Caterpillar Inc., Peoria, Ill.

[21] Appl. No.: 614,232

[22] Filed: Mar. 12, 1996

[51] Int. Cl.⁶ ............................................. B23K 26/00
[52] U.S. Cl. ........................... 219/121.67; 219/121.6; 359/838
[58] Field of Search ................... 219/121.6, 121.67, 219/121.7, 121.71, 121.72, 121.74; 359/838

[56] References Cited

U.S. PATENT DOCUMENTS

| | | | |
|---|---|---|---|
| 3,865,114 | 2/1975 | Sharon | 219/121.6 |
| 4,465,919 | 8/1984 | Roder | 219/121.67 |
| 4,891,028 | 1/1990 | Kautz et al. | 219/121.72 |
| 5,516,998 | 5/1996 | Chatelain et al. | 219/121.7 |

FOREIGN PATENT DOCUMENTS

| | | | |
|---|---|---|---|
| 254543 | 3/1988 | Germany | 219/121.72 |
| 59-66032 | 4/1984 | Japan | 219/121.71 |
| 61-82986 | 4/1986 | Japan | 219/121.72 |
| 61-269996 | 11/1986 | Japan | 219/121.71 |
| 4-333389 | 11/1992 | Japan | 219/121.6 |
| 6-55291 | 3/1994 | Japan | 219/121.6 |

*Primary Examiner*—Teresa J. Walberg
*Assistant Examiner*—Gregory L. Mills
*Attorney, Agent, or Firm*—Pankaj M. Khosla

[57] ABSTRACT

A laser beam deflector is useable for protecting underlying portions of an item during laser cutting of overlaying stock. The deflector has a base surface width greater than the overlying stock to be cut and a smooth deflecting surface of an arcuate cross-sectional configuration. The deflector is positionable between the overlaying stock and the underlying portions desired to be protected with the deflecting surface immediately adjacent the overlaying stock.

6 Claims, 3 Drawing Sheets

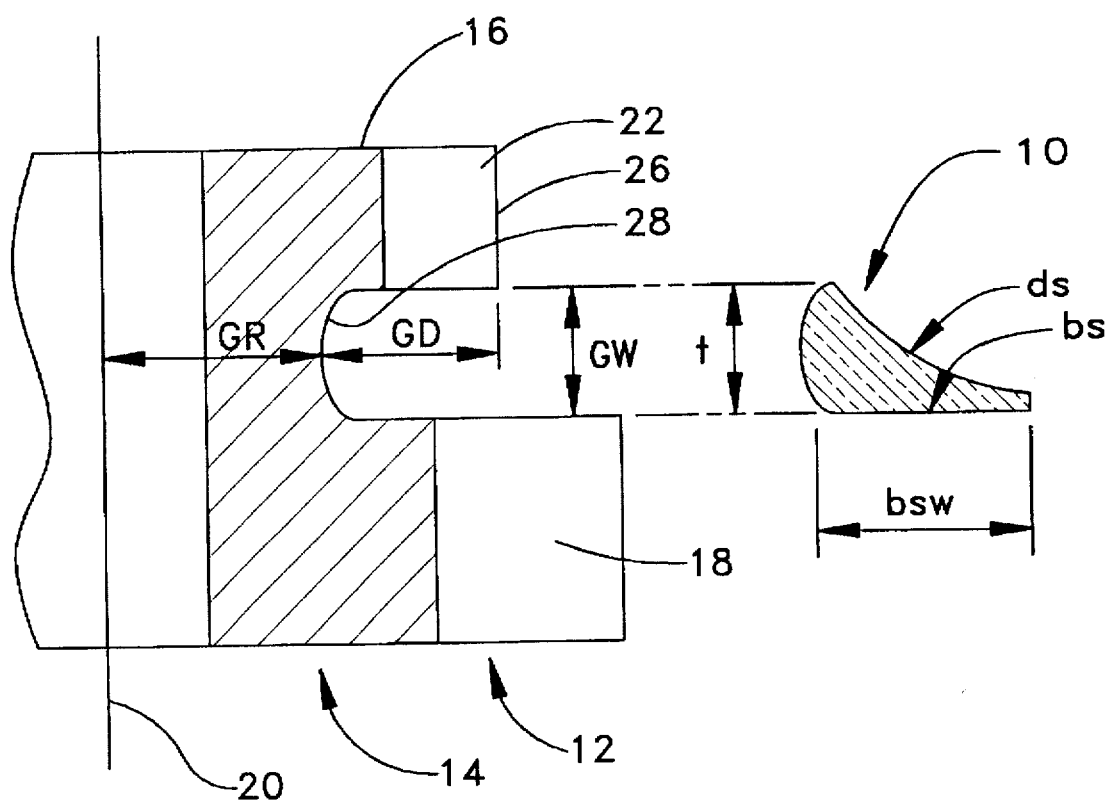
Fig_4_

1

LASER BEAM DEFLECTOR FOR PROTECTION OF UNDERLYING PORTIONS OF AN ITEM DURING LASER CUTTING OF OVERLAYING STOCK

TECHNICAL FIELD

The present invention relates to a laser beam deflector for protecting underlying apparatus while laser cutting overlaying stock. More particularly, the present invention relates to a laser beam deflector used in the manufacture of a timing gear or the like.

1. Background Art

In the art of manufacturing using lasers to cut metal to form an article, such as for example a gear, underlying portions of the gear or other element may be damaged. Such has been the case in manufacturing timing gears. In order to avoid such damage, these type gears and other equipment has generally been formed by a shaper.

Shaper forming of teeth and notches is slow and requires the waste of manpower, time, money, and natural resources relative to the work that can be accomplished by laser cutting.

The present invention is directed to overcoming one or more of the problems as set forth above.

2. Disclosure of the Invention

In one aspect of the invention, a laser beam deflector is provided for protecting underlying portions of an item during laser cutting of overlaying stock. The deflector has a base surface width greater than the depth of the overlaying stock to be cut and a deflector surface "ds" of an arcuate cross-sectional configuration. The deflector is positionable between the overlaying stock and the underlying portions desired to be protected and with the deflection surface "ds" immediately adjacent the overlaying stock.

In another aspect of the invention, a laser beam deflector is provided for protecting underlying gear teeth of a gear during laser cutting of notches in overlaying stock. The overlaying stock has an outer surface. The notches have a depth "D" and are separated from the gear teeth by a circumferentially extending groove. The notches further have a groove depth "D" as measured from a bottom of the groove to the overlying stock outer surface, a groove radius "GR" and a groove width "GW". The deflector has a deflecting surface "ds", a base surface "bs", a base surface width "bsw", a thickness "t", a radius "r" and an arcuate length "l". The deflector has dimensions relative to the gear such that the base surface width "bsw" is greater than the groove depth "GD", the radius "r" is substantially equal to the groove radius "GR", the thickness "t" is less than the groove width "GW", the arcuate length extends at least 120 degrees, and the deflecting surface "ds" is of an arcuate cross-sectional configuration.

BRIEF DESCRIPTION OF THE DRAWINGS

FIG. 4 is a diagrammatic enlarged partial top view of the deflector and the item to be laser cut.

BEST MODE FOR CARRYING OUT THE INVENTION

Figure 1:
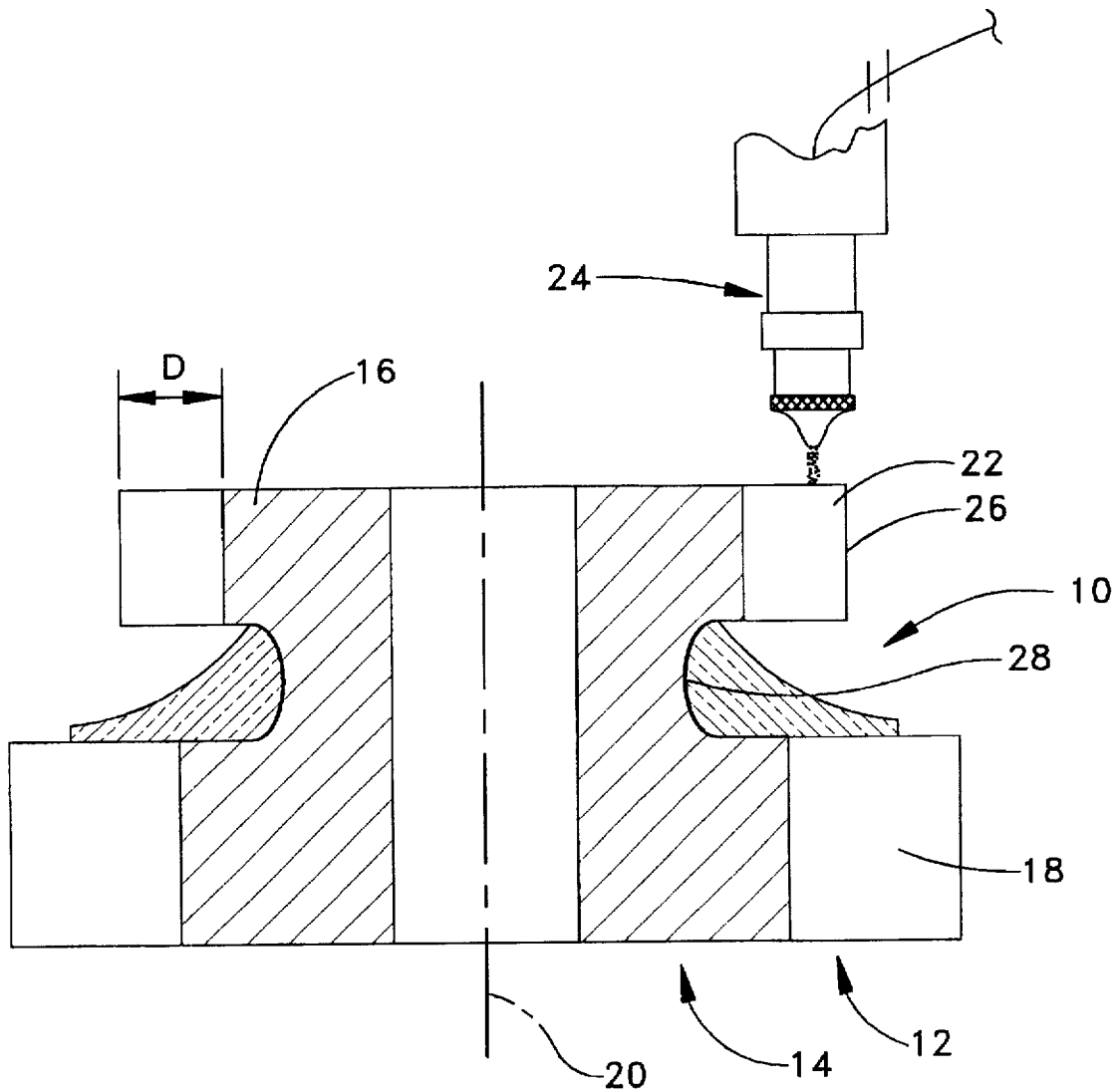
FIG. 1 is a diagrammatic side view of an item to be laser cut and having the deflector of this invention positioned thereon.
Figure 2:
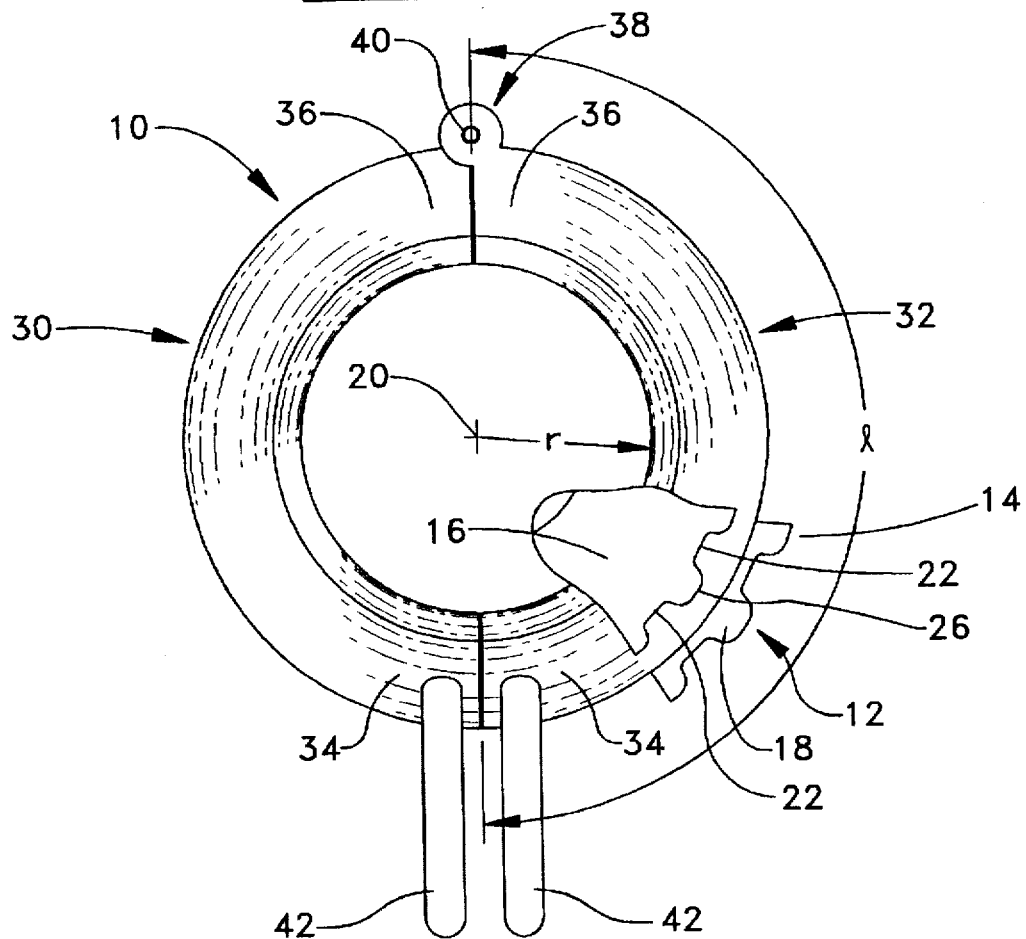
FIG. 2 is a diagrammatic top view of the deflector.

Referring to FIGS. 1, 2, and 4, a laser beam deflector 10 is provided for protecting an underlying portion(s) 12 of an item, such as a timing gear 14, during laser cutting of overlying stock 16. The underlying portions of the subject embodiment are gear teeth 18. The timing gear 14 has an axial centerline 20. In the item of FIG. 1, timing notches 22 are being cut in the overlaying stock 16 of the timing gear 14 by a laser cutting apparatus a portion of which is illustrated at 24. It should be understood, however that the item 14 can be other than a timing gear 14 without departing from this invention.

The overlaying stock 16 has an outer peripheral surface 26 and the notches 22 have a depth "D". Referring to FIG. 4, the overlaying stock 16 is separated from the gear teeth 12 by a circumferentially extending groove 28 having a groove depth "GD", as measured from a bottom of the groove 28 to the overlying stock outer peripheral surface 26. The groove 28 has a groove radius "GR" and a groove width "GW".

As shown in FIGS. 2 and 4, the laser beam deflector 10 has a smooth deflecting surface "ds", a base surface "bs", a base surface width "bsw", a thickness "t", a radius "r", and an arcuate length "l". The deflector 10 has dimensions relative to the gear wherein, the base surface width "bsw" is greater than the groove depth "GD", the deflector radius "r" is substantially equal to the groove radius "GR", the thickness "t" of the deflector is less than the groove width "GW", the deflector arcuate length "l" extends at least 120 degrees, and the deflecting surface "ds" is of an arcuate cross-sectional configuration.

As shown in FIGS. 1 and 2, the deflector 10 is positionable between the overlaying stock 16 and the underlying portions 12 desired to be protected and with the deflecting surface "ds" immediately adjacent the overlaying stock 16. As best shown in FIG. 2, the deflector 10 is defined by first and second deflector portion 30 and 32 each having first and second end portion 34 and 36 and an arcuate length "l" of about 180 degrees. The first and second portion 30 and 32 are pivotally connected one to the other. Means 38 releasable connects the second ends 36 of the deflector portions one to the other. The second ends 36 of the deflector portions 30 and 32 overlap each other and the means 38 for releasably connecting the second ends 36 includes a pivot pin 40 that extends though the overlapping second ends. A handle 42 extends radially outward from each first end portion 30 to aid in the manual pivoting of the first and second portions 30 and 32 about pivot 40.

Figure 3:
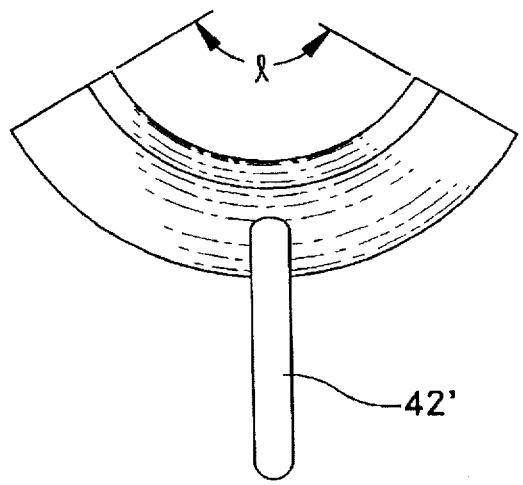
FIG. 3 is a diagrammatic top view of a deflector of a different design.

FIG. 3 is a diagrammatic top view of a laser beam deflector 10' of a different design. The deflector 10' has an arcuate length "l" extending at least 120 degrees and a handle 42' that extend radially outwardly intermediate its ends. The deflector 10' has a smooth deflecting surface "ds", a base surface "bs", a base surface width "bsw", a thickness "t", and a radius "r" identical to the deflector 10. The deflector is positionable between the overlaying stock and the underlying portions desired to be protected and with the deflecting surface "ds" immediately adjacent the overlaying stock.

INDUSTRIAL APPLICABILITY

The deflectors 10, 10' are positionable between the overlaying stock 16 and the underlying portions 12 desired to be protected with the deflecting surface "ds" immediately adjacent the overlaying stock 16. The laser cutting apparatus emits a beam which is used to cut the timing notches in the overlaying stock 16. The beam is harmlessly diffused away from the underlaying gear teeth 18 by the smooth arcuate deflecting surface "ds". Preferably the laser beam deflector 10, 10' is manufactured from copper or alternatively from other highly reflective material. The first and second portion 30 and 32 are hinged together and positionable in the groove 28.

We claim:

1. A laser beam deflector for protecting underlying portions of an item during laser cutting of overlaying stock, comprising:

a deflecting surface "ds" of an arcuate cross-sectional configuration, said deflector being defined by first and second portions each having first and second end portions and an arcuate length "l" of about 180 degrees, said first end portions being pivotally connected to one another, said deflector being positionable between said overlaying stock and underlying portions desired to be protected, and said deflecting surface "ds" being immediately adjacent said overlaying stock.

2. A laser beam deflector for protecting underlying gear teeth of a gear during laser cutting of notches in overlaying stock, comprising said overlaying stock having an outer surface and being separated from the gear teeth by a circumferentially extending groove having a groove depth "GD", as measured from a bottom of the groove to the overlying stock outer surface, a groove radius "GR" and a groove width "GW", said notches having a depth "D";

said deflector having a deflecting surface "ds" a base surface "bs" a base surface width "bsw" a thickness "t", a radius "r", and an arcuate length "l"; said deflector having dimensions relative to the gear wherein, said base service width "bsw" is greater than the groove depth "GD" said deflector radius "r" is substantially equal to the groove radius "GR", said thickness "t" of the deflector is less than the groove width "GW", said deflector arcuate length "l" extends at least 120 degrees, and said deflecting surface "ds" is of arcuate cross-sectional configuration.

3. A deflector, as set forth in claim 2, wherein the arcuate length "l" is about 360 degrees.

4. A deflector, as set forth in claim 3, wherein the deflector is defined by first and second portions each having first and second end portions and an arcuate length "l" of about 180 degrees, said first end portions being pivotally connected one to the other.

5. A deflector, as set forth in claim 4, including means for releasable connecting the second ends of the deflector portions one to the other.

6. A deflector, as set forth in claim 2, wherein the deflecting surface "ds" is of convex cross-sectional configuration.

* * * * *